(12) United States Patent
Tokumasu et al.

(10) Patent No.: US 8,025,719 B2
(45) Date of Patent: Sep. 27, 2011

(54) REGENERATED SULFUR RECOVERY APPARATUS

(75) Inventors: Yoshihisa Tokumasu, Saijo (JP); Kazuo Fujita, Niihama (JP); Fumio Kubo, Niihama (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 399 days.

(21) Appl. No.: 12/410,072

(22) Filed: Mar. 24, 2009

(65) Prior Publication Data
US 2009/0242379 A1    Oct. 1, 2009

(30) Foreign Application Priority Data
Mar. 25, 2008    (JP) .................. P2008-079345

(51) Int. Cl.
*B01D 59/26*    (2006.01)
(52) U.S. Cl. ............ 96/108; 96/109; 96/145; 423/576.2
(58) Field of Classification Search .............. 96/108, 96/109, 143, 145; 95/135, 148, 290; 423/576.2
See application file for complete search history.

(56) References Cited

U.S. PATENT DOCUMENTS

| | | | |
|---|---|---|---|
| 2,961,301 A | 11/1960 | Steinhoff et al. | |
| 4,391,791 A | 7/1983 | Palm et al. | |
| 4,526,590 A | 7/1985 | Palm et al. | |
| 4,684,514 A | 8/1987 | Chen | |
| 5,080,695 A | 1/1992 | Kassarjian | |
| 5,716,465 A | 2/1998 | Hara et al. | |
| 5,807,410 A * | 9/1998 | Borsboom et al. | ........... 23/293 S |
| 2005/0224143 A1 | 10/2005 | Takabe et al. | |

FOREIGN PATENT DOCUMENTS

| | | |
|---|---|---|
| EP | 1 142 628 A2 | 10/2001 |
| EP | 1 143 024 A1 | 10/2001 |
| GB | 409055 A | 4/1934 |
| GB | 2 250 217 A | 6/1992 |
| JP | 8-100236 A | 4/1996 |
| JP | 2000-178697 A | 6/2000 |
| WO | WO-2004/057050 A1 | 7/2004 |

OTHER PUBLICATIONS

Australian Search Report and Written Opinion issued on Oct. 2, 2009 in corresponding Singapore Application No. SG 200902077-7.

* cited by examiner

*Primary Examiner* — Robert A Hopkins
(74) *Attorney, Agent, or Firm* — Birch, Stewart, Kolasch & Birch, LLP

(57) ABSTRACT

A regenerated sulfur recovery apparatus positioned in a sulfur recovery plant, which apparatus contains a sulfur purifier that cools gaseous sulfur and condensates it, forming liquid sulfur while removing impurities contained therein; the apparatus containing a steam supplying means for melting solid sulfur deposited on an inner wall of the sulfur purifier, a molten sulfur reservoir that recovers and stores the melted sulfur, a reservoir heating means that heats the reservoir, an exhaust gas line that directs to the outside an exhaust gas formed in the reservoir when the reservoir is heated by the reservoir heating means, and an inert gas supply means that supplies an inert gas to the reservoir, such that the inert gas supplied into the reservoir flows to the outside through the exhaust gas line when molten sulfur stored in the reservoir is discharged from the reservoir.

1 Claim, 3 Drawing Sheets

REGENERATED SULFUR RECOVERY APPARATUS

CROSS REFERENCE TO RELATED APPLICATION

The present application claims the priority under the Paris Convention based on Japanese Patent Application No. 2008-079345, which is incorporated herein by reference in their entirety.

FIELD OF THE INVENTION

The present invention relates to a regenerated sulfur recovery apparatus of a sulfur recovery plant which apparatus recovers gaseous sulfur in the state of liquid sulfur by converting it into the liquid sulfur.

BACKGROUND OF THE INVENTION

A sulfur recovery plant is commercially used including a sulfur purifier which cools gaseous sulfur so as to condensate to produce liquid sulfur while removing impurities contained therein. Such gaseous sulfur is, for example, produced from hydrogen sulfide formed as a by-product in a hydrodesulfurization plant or a synthetic gas production plant. Such sulfur recovery plant includes a regenerated sulfur recovery apparatus which recovers sulfur as reusable regenerated sulfur while melting solid sulfur depositing onto an inner wall of the sulfur purifier. FIG. 3 schematically shows a flow sheet of the regenerated sulfur recovery apparatus 200 of the prior art.

A sulfur recovery plant 201 includes a regenerated sulfur recovery apparatus 200, a sulfur gas production apparatus (not shown), a sulfur purifier 210, and a sulfur recovery tank (not shown). The sulfur production apparatus burns sulfur sulfide ($H_2S$) as a raw material so as to form sulfur dioxide ($SO_2$), and reacts sulfur dioxide and hydrogen sulfide so as to form gaseous sulfur.

The sulfur purifier 210 and the sulfur recovery tank are used to recover the gaseous sulfur in the state of liquid which sulfur is produced in the sulfur production apparatus. The sulfur purifier 210 is controlled to keep its inside temperature at a temperature which is a little higher than a solidification temperature of sulfur (for example, 130° C. to 150° C.). The gaseous sulfur having been supplied into the sulfur purifier 210 through a sulfur gas supply line 213 when a sulfur gas supply line valve 212 is opened is formed into liquid droplets. At this stage, the liquid droplets contact with an adsorbent in the sulfur purifier 210, so that impurities (such as chlorine, ammonia and so on) contained in the liquid droplets are removed by means of the adsorption, and liquid sulfur produced through the condensation is discharged while passing through a liquid sulfur discharge line 215 when a discharge line valve 214 is opened. The liquid sulfur thus discharged from the sulfur purifier 210 is recovered in a sulfur recovery tank.

The regenerated sulfur recovery apparatus 200 melts solid sulfur deposited onto an inner wall of the sulfur purifier 210 and recovers such molten sulfur as regenerated sulfur which is able to be reused. The regenerated sulfur recovery apparatus 200 comprises a steam supply means 218, a molten sulfur reservoir 220 and a regenerated sulfur recovery tank 230.

A steam supply means 218 supplies steam at a temperature of about 150° C. into the sulfur purifier 210 through a steam supply line 217 when a steam supply line valve 216 is opened, so that the solid sulfur deposited onto the inner wall of the sulfur purifier 210 is melted. Thus molten sulfur passes through a molten sulfur flowing line 223 when a flowing line valve 222 is opened, and it is recovered and stored by the molten sulfur reservoir 220. The molten sulfur stored in the molten sulfur reservoir 220 contains much water derived from the steam supplied by the steam supply means 218, and such water contained in the molten sulfur is converted to steam when the molten sulfur reservoir 220 is heated by a reservoir heating means 221. Such steam is exhausted to the outside of the reservoir through an exhaust gas line 241 together with an exhaust gas such as hydrogen sulfide, and then subjected to a detoxification treatment in an exhaust gas detoxification apparatus 240.

DISCLOSURE OF THE INVENTION

Summary of the Invention

The sulfur of which water has thus been removed flows through a regenerated sulfur recovery line 232 when a recovery line valve 231 is opened, and it is recovered into the regenerated sulfur recovery tank 230. At this stage, the exhaust gas line valve 242 is opened so that the molten sulfur reservoir 220 is communicated with the outside thereof through the exhaust gas line 241. It has been found that the inner wall of the molten sulfur reservoir 220 may be corroded when the operation of the sulfur recovery apparatus as described above is repeatedly carried out.

Patent References 1 to 3 indicated below describe technologies related to martensite based stainless steels having improved anticorrosion properties under an atmosphere containing a sulfide such as hydrogen sulfide.

Patent Reference 1: Japanese Patent Kokai Publication No. 1996-100236
Patent Reference 2: Japanese Patent Kokai Publication No. 2000-178697
Patent Reference 3: Japanese Patent Kohyo Publication No. 2004-100236

When the martensite stainless steels as described in Patent References 1 to 3 are applied to the material which forms the molten sulfur reservoir 220, the corrosion of the inner wall of the molten sulfur reservoir 220 is able to be suppressed, but such suppression is not yet satisfactory, so that the application of such stainless steels is not a fundamental solution as to the corrosion.

The inventors have studied intensively as to the reason of the corrosion of the inner wall of the molten sulfur reservoir 220. As a result, it has been found that the corrosion of the inner wall of the molten sulfur reservoir 220 is resulted from the ingress of air as an outside gas into the molten sulfur reservoir 220 through the exhaust gas line 241. That is, it has been clarified that mixing of the air into an atmosphere in the molten sulfur reservoir 220 containing hydrogen sulfide and steam leads to the corrosion of the inside wall of the molten sulfur reservoir 220.

It is, therefore, an object of the present invention to provide a regenerated sulfur recovery apparatus installed in a sulfur recovery plant in which apparatus solid sulfur deposited onto an inner wall of a sulfur purifier is melted to be regenerated sulfur, and an atmosphere in a molten sulfur reservoir is prevented from containing hydrogen sulfide, steam and air when such molten regenerated sulfur further heated is discharged from the molten sulfur reservoir, so that the corrosion of an inner wall of the molten sulfur reservoir is prevented.

The present invention provides a regenerated sulfur recovery apparatus positioned in a sulfur recovery plant which apparatus comprises a sulfur purifier which cools gaseous sulfur so as to condensate it to form liquid sulfur while removing impurities contained therein, and such apparatus is characterized in that it comprises a steam supplying means which supplies steam into the sulfur purifier, so that solid sulfur deposited onto an inner wall of the sulfur purifier is melted, a molten sulfur reservoir which recovers and stores such sulfur melted by the steam supplying means, a reservoir heating means which heats the molten sulfur reservoir, an exhaust gas line which directs an exhaust gas formed in the molten sulfur reservoir to its outside which gas is formed when the molten sulfur reservoir is heated by the reservoir heating means, and an inert gas supply means which supplies an inert gas to the molten sulfur reservoir, and that the inert gas supply means supplies the inert gas such that the inert gas supplied into the molten sulfur reservoir flows to its outside through the exhaust gas line when the molten sulfur stored in the molten sulfur reservoir is discharged from the molten sulfur reservoir. Particularly, thus supplied inert gas flows to the outside of the molten sulfur reservoir through the exhaust gas line.

Effects of the Invention

According to the present invention, the steam supply means supplies the steam into the sulfur purifier so that the solid sulfur deposited onto the inner wall of the sulfur purifier is melted. The sulfur thus melted is recovered and stored by the molten sulfur reservoir. When the molten sulfur reservoir is heated by the reservoir heating means, the water, hydrogen sulfide and the like contained in the molten sulfur are exhausted as gases to the outside of the reservoir through the exhaust gas line. At this stage, the inert gas supply means supplies the inert gas such that the inert gas supplied into the molten sulfur reservoir flows to its outside through the exhaust gas line.

Therefore, the ingress of the air as the outside gas into the molten sulfur reservoir through the exhaust gas line is prevented by the stream of the inert gas which flows through the exhaust gas line to the outside from the inside of the molten sulfur reservoir. Thus, the atmosphere within the molten sulfur reservoir is prevented from containing hydrogen sulfide, steam and the air, so that the corrosion of the inner wall of the molten sulfur reservoir is prevented.

Figure 1:
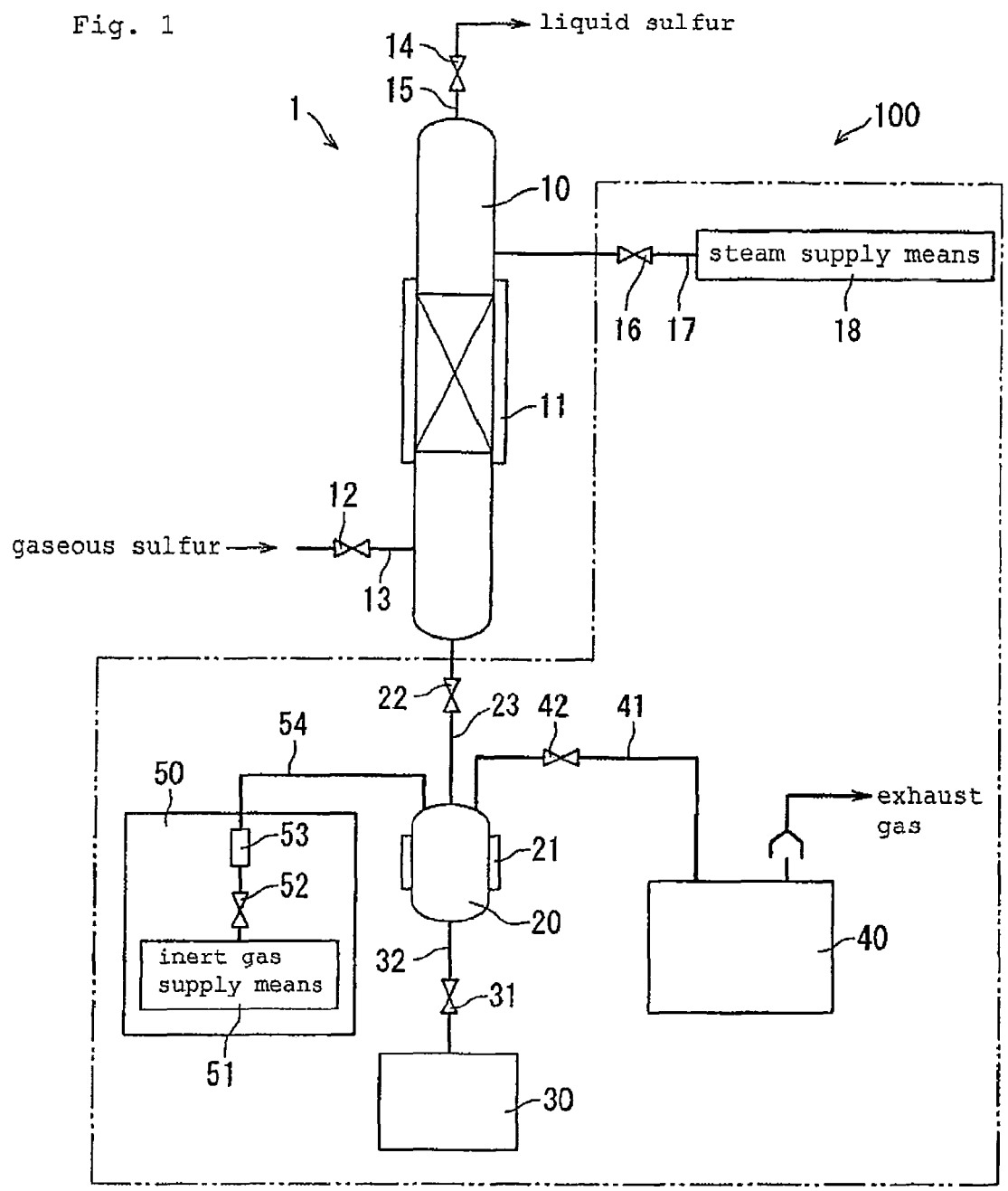
FIG. 1 schematically shows a flow sheet of one embodiment of the regenerated sulfur recovery apparatus 100 according to the present invention.

| REFERENCE NUMERALS | |
| --- | --- |
| 1, 200 | sulfur recovery plant |
| 10, 210 | sulfur purifier |
| 14, 214 | discharge line valve |
| 15, 215 | liquid sulfur discharge line |
| 16, 216 | steam supply line valve |
| 17, 217 | steam supply line |

-continued

| REFERENCE NUMERALS | |
| --- | --- |
| 18, 218 | steam supply means |
| 20, 220 | molten sulfur reservoir |
| 21, 221 | reservoir heating means |
| 22, 222 | flowing line valve |
| 23, 223 | molten sulfur flowing line |
| 30, 230 | regenerated sulfur recovery tank |
| 31, 231 | recovery line valve |
| 32, 232 | regenerated sulfur recovery line |
| 40, 240 | exhaust gas detoxification apparatus |
| 41, 241 | exhaust gas line |
| 42, 242 | exhaust gas line valve |
| 50 | outside gas ingress prevention apparatus |
| 51 | inert gas supply means |
| 52 | inert gas supply line valve |
| 53 | flow meter |
| 54 | inert gas supply line |
| 100, 200 | regenerated sulfur recovery apparatus |

DETAILED DESCRIPTION OF THE INVENTION

FIG. 1 schematically shows a flow sheet of one embodiment of the sulfur recovery apparatus 100 according to the present invention. The regenerated sulfur recovery apparatus is positioned in a sulfur recovery plant 1. The sulfur recovery plant 1 produces gaseous sulfur from hydrogen sulfide, and recovers such gaseous sulfur by converting it to liquid sulfur.

The sulfur recovery plant 1 comprises a regenerated sulfur recovery apparatus 100, a sulfur gas production apparatus (not shown), a sulfur purifier 10, and a sulfur recovery tank (not shown). The sulfur production apparatus burns sulfur sulfide ($H_2S$) gas as a raw material so as to form sulfur dioxide ($SO_2$), and reacts sulfur dioxide and hydrogen sulfide so as to form gaseous sulfur.

The sulfur purifier 10 and the sulfur recovery tank are used to recover the gaseous sulfur in the state of liquid which sulfur is produced in the sulfur production apparatus. The sulfur purifier 10 is controlled to keep its inside temperature at a temperature which is a little higher than the solidification temperature of sulfur (for example, 130° C. to 150° C.). The gaseous sulfur supplied into the sulfur purifier 10 through a sulfur gas supply line 13 when a sulfur gas supply line valve 12 is opened is converted to liquid droplets. At this stage, the liquid droplets contact with an adsorbent in the sulfur purifier 10, so that impurities (such as chlorine, ammonia and so on) contained in the liquid droplets are removed by means of the adsorption, and liquid sulfur formed through the condensation is discharged while passing through a liquid sulfur discharge line 15 when a discharge line valve 14 is opened. The liquid sulfur thus discharged from the sulfur purifier 10 is recovered in a sulfur recovery tank.

The regenerated sulfur recovery apparatus 100 melts solid sulfur deposited onto an inner wall of the sulfur purifier 10 and recovers such molten sulfur as regenerated sulfur which is able to be reused. The regenerated sulfur recovery apparatus 100 comprises a steam supply means 18, a molten sulfur reservoir 20, a regenerated sulfur recovery tank 30, an exhaust gas detoxification apparatus 40 and an outside gas ingress prevention apparatus 50.

The steam supply means 18 supplies steam at a temperature of about 150° C. into the sulfur purifier 10 through a steam supply line 17 when a steam supply line valve 16 is opened, so that the solid sulfur deposited onto the inner wall of the sulfur purifier 10 is melted.

The molten sulfur reservoir 20 recovers and stores the sulfur melted in the sulfur purifier 10 by the steam supply means 18, and it is made of a metal such as a stainless steel.

The sulfur purifier 10 and the molten sulfur reservoir 20 are connected through a molten sulfur flowing line 23, and the communication state and the non-communication state between the purifier 10 and the reservoir 20 can be switched from each other by means of closing or opening of the flowing line valve 23. The molten sulfur reservoir 20 comprises a molten sulfur reservoir heating means 21, an exhaust gas detoxification apparatus 40, and an outside gas ingress prevention means 50. The molten sulfur stored in the molten sulfur reservoir 20 contains much water derived from the steam which has been supplied by the steam supply means 18. When the molten sulfur reservoir 20 is heated by the reservoir heating means 21, the water contained in the molten sulfur becomes steam, which is discharged through the exhaust gas line 41 together with the an exhaust gas such as $H_2S$ gas, and subjected to the detoxification treatment by the exhaust gas detoxification apparatus 40.

The outside gas ingress prevention means 50 comprises an inert gas supply means 51, an inert gas supply line valve 52, a flow meter 53 and an inert gas supply line 54. The inert gas supply means 51 supplies an inert gas such as nitrogen ($N_2$), argon (Ar) or the like to the molten sulfur reservoir 20 through the inert gas supply line 54 when the inert gas supply line valve 52 is opened. The inert gas supply means 51 supplies the inert gas such that the inert gas supplied into the molten sulfur reservoir 20 flows to the outside of the molten sulfur reservoir through the exhaust gas line 41.

In this way, when a recovery line valve 31 which will be described below is opened so that the regenerated sulfur is being recovered into the regenerated sulfur recovery tank 30, air as the outside gas is prevented from flowing into the molten sulfur reservoir 20 through the exhaust gas line 41 due to the stream of the inert gas from the inside to the outside of the molten sulfur reservoir 20 flowing through the exhaust gas line 41. The flow meter 53 controls an amount of the inert gas which is supplied by the inert gas supply means 51.

The regenerated sulfur recovery tank 30 recovers and stores, as regenerated sulfur, the sulfur of which water has been removed by heating the molten sulfur stored in the molten sulfur reservoir 20 by the molten sulfur reservoir heating means 21. The molten sulfur reservoir 20 and the regenerated sulfur recovery tank 30 are connected via a regenerated sulfur recovery line 32, and their communication state and non-communication state can be switched from each other by means of closing or opening of a recovery line valve 31. It is noted that the exhaust gas line valve 42 is in the open state and the molten sulfur reservoir 20 is communicated with its outside through the exhaust gas line 41 when the recovery line valve 31 is opened and the regenerated sulfur is flowing through the regenerated sulfur recovery line 32 and being recovered in the regenerated sulfur recovery tank 30.

The molten sulfur recovery apparatus 100 further comprises a control means (not shown) which may be for example a CPU (Central Processing Unit) or the like. The control means controls the switching operations of the valves such as the sulfur gas supply line valve 12, the exhaust gas line valve 14, the steam supply line valve 16, the flowing line valve 22, the recovery line valve 31, the exhaust gas line valve 42 and the like, and also controls the operations of the various means such as the steam supply means 18, the reservoir heating means 21, the inert gas supply means 51 and the like.

Figure 2:
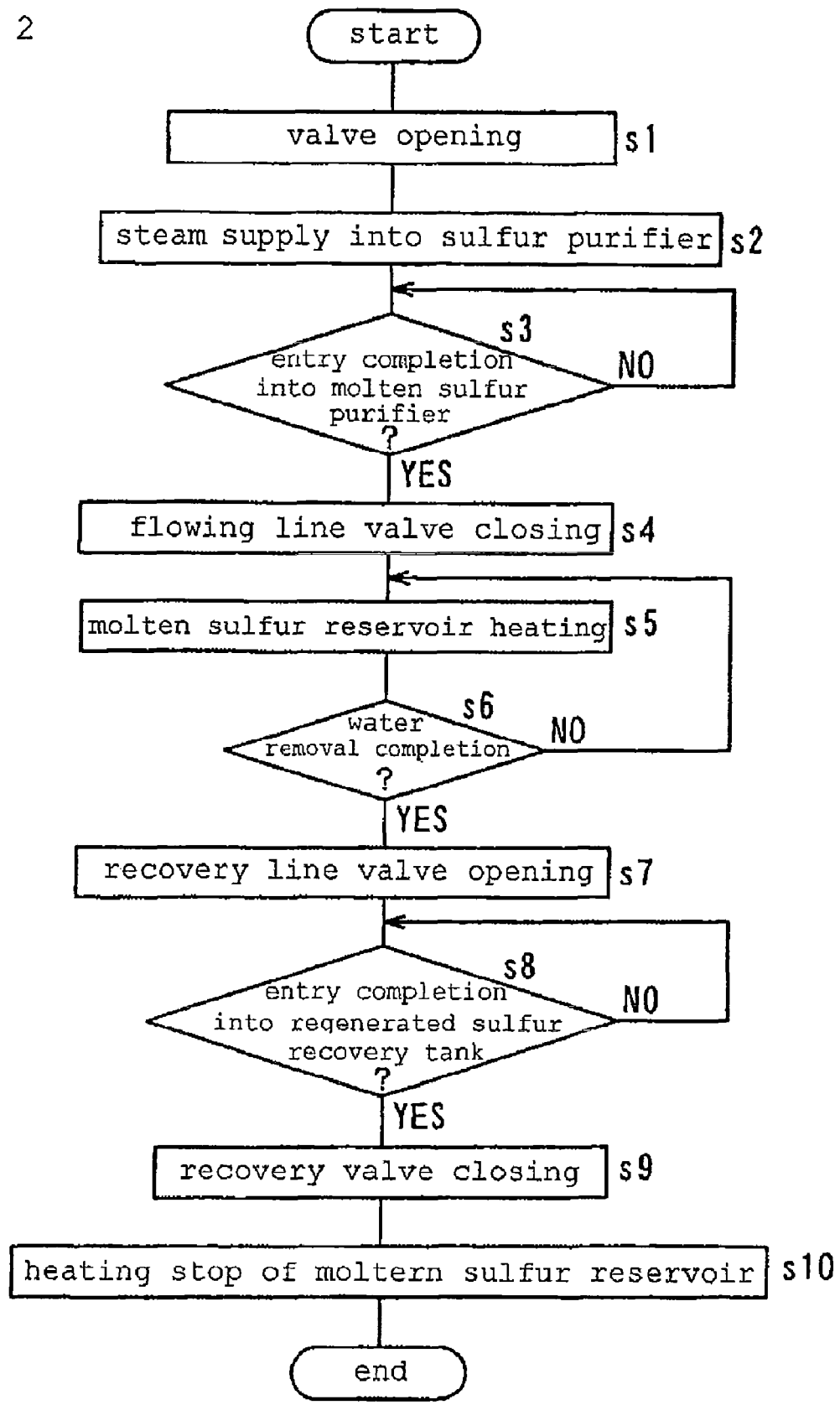
FIG. 2 schematically shows a flow chart of a recovery process of regenerated sulfur using the sulfur recovery apparatus 100 according to the present invention.
Figure 3:
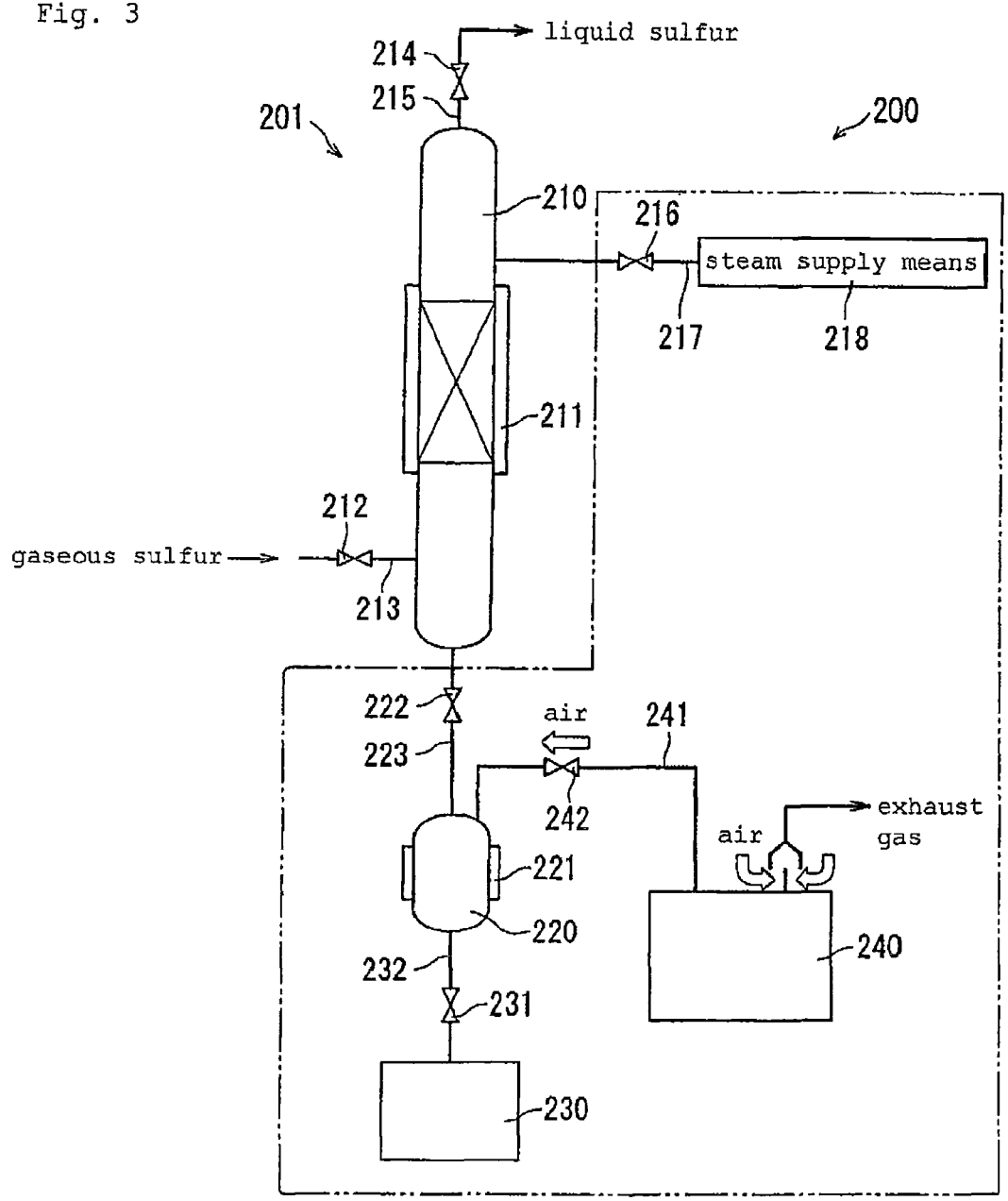
FIG. 3 schematically shows a flow sheet of the regenerated sulfur recovery apparatus 200 of the prior art.

FIG. 2 schematically shows a flow chart which shows steps of the recovery process of regenerated sulfur while using the sulfur recovery apparatus 100. The recovery of the re generated sulfur is started upon the state in which the gaseous sulfur has been condensed in the sulfur purifier 10 into the liquid sulfur, and such liquid sulfur has been recovered in the sulfur recovery tank, so that there is no liquid sulfur left in the sulfur purifier 10. In this state, the control means opens the inert gas supply valve 52, and supplies the inert gas into the molten sulfur reservoir 20 while controlling the inert gas supply means 51. Simultaneously, the control means opens the exhaust gas line valve 42 so that the molten sulfur reservoir 20 and its outside are communicated with each other via the exhaust gas line 41. The control means controls the inert gas supply means so that the inert gas which is supplied into the molten sulfur reservoir 20 flows out through the exhaust gas line 41 to the outside. The other valves provided in the regenerated sulfur recovery apparatus 100 are in the closed states.

First, in the step s1, the control means opens the flowing line valve 22, so that the sulfur purifier 10 and the molten sulfur reservoir 20 are communicated with each other through the molten sulfur flowing line 23. Then, in the step s2, the control means opens the steam supply line valve 16 and also controls the steam supply means 18 so as to supply steam at a temperature of about 150° C. into the sulfur purifier 10. By supplying the steam, the solid sulfur deposited on the inner wall of the sulfur purifier 10 is melted to be the liquid sulfur, and such liquid sulfur flows through the molten sulfur flowing line 23 and it is recovered and stored in the molten sulfur reservoir 20.

Then, in the step s3, the control means determines whether the discharge (or entry) of the molten sulfur into the molten sulfur reservoir 20 has been completed. For purpose of this determination, for example, a liquid level in the sulfur purifier 10 is measured by means of a liquid level gauge or the like, and the completion of the discharge is determined on the basis of the liquid level measurement. When it has been determined that the discharge of the molten sulfur into the molten sulfur reservoir 20 has been completed, the step s4 will be carried out. In the step s4, the control means closes the flowing line valve 22, so that the sulfur purifier 10 is not communicated with the molten sulfur reservoir 20.

Then, in the step s5, the control means controls the reservoir heating means 21, so that the molten sulfur reservoir is heated to a temperature of 130° C. to 150° C. By such heating, the water contained in the molten sulfur stored in the molten sulfur reservoir 20 becomes steam, which is exhausted to the outside of the molten sulfur reservoir through the exhaust gas line 41 together with an exhaust gas which comprises hydrogen sulfide ($H_2S$) and the like.

Then, in the step s6, the control means determine whether or not an amount of water contained in the molten sulfur has become less than a predetermined amount. Such determination may be carried out by, for example, measuring an amount of water in the molten sulfur contained in the molten sulfur reservoir 20 by means of a water content measuring device, followed by estimation as to the achievement to the predetermined amount on the basis of the measurements. Alternatively, the determination may be carried out by estimating whether or not a predetermined time has passed after start of the heating by means of the reservoir heating means 21. When it has been determined that the amount of water contained in the molten sulfur is not larger than the predetermined amount, the step s7 will be carried out. When it has been determined that the amount of water contained in the molten sulfur is larger than the predetermined amount, return to the step s5 will be carried out.

In the step s7, the control means opens the recovery valve 31, so that the molten sulfur reservoir 20 and the regenerated sulfur recovery tank 30 are communicated with each other through the regenerated sulfur recovery line 32. By thus opening, the regenerated sulfur of which water amount has been reduced is recovered and stored in the regenerated sulfur recovery tank 30. At this stage, the inert gas which is supplied to the molten sulfur reservoir 20 is flowing to the outside of the molten sulfur reservoir through the exhaust gas line 41, so that the air as an outside gas is prevented from flowing into the molten sulfur reservoir 20 through the exhaust gas line 41.

Then, in the step s8, the control means determine whether or not the discharge (or entry) of the regenerated sulfur into the regenerated sulfur recovery tank 30 has been completed. For the purpose of such determination, for example the liquid level of the molten sulfur reservoir 20 is measured by a liquid level gauge, and the estimation is carried out on the basis of the measurements. When it is determined that the discharge (or entry) of the regenerated sulfur into the regenerated sulfur recovery tank 30 has been completed, the step s9 will be carried out In the step s9, the control means closes the recovery line valve 31, so that the molten sulfur reservoir 20 and the regenerated sulfur recovery tank 30 are not communicated with each other. Then, in the step s10, the control means controls the reservoir heating means 21 so as to stop heating the molten sulfur reservoir 20, so that the operation for the regenerated sulfur recovery is finished.

As described above, when the regenerated sulfur is being recovered into the regenerated sulfur recovery tank 30 while opening the valve 31, the inert gas supply means 51 supplies the inert gas into the molten sulfur reservoir 20. By such supply of the inert gas, the air as the gas outside the molten sulfur reservoir 20 is prevented from flowing into the molten sulfur reservoir 20 by means of the stream of the inert gas which flows from the molten sulfur reservoir 20 to its outside through the exhaust gas line 41, so that the atmosphere in the molten sulfur reservoir 20 is prevented from containing hydrogen sulfide gas, steam and the air.

Next, experiments were carried out in order to estimate effects as to the corrosion of the molten sulfur reservoir 20 comprising a stainless steel when the inert gas supply means 51 supplies the inert gas into the molten sulfur reservoir 20.

(Experiment 1)

Five metal pieces M1 to M5 in the form of U-bend shape to which a stress was loaded according to JIS G0576 (methods of stress corrosion crack test of stainless steels) were placed in a vessel having an inner volume of 1.5 liters, to which pure water (700 ml) was charged. Then, $N_2$ gas and $H_2S$ gas were bubbled into the water at a normal temperature (25° C.) so that the pure water contained a saturated amount of $H_2S$, and the vessel which contained the metal pieces and the pure water thus prepared was left for one week as it was. Then, after the metal pieces M1 to M5 were removed from the vessel and dried, their corrosion rates and appearance changes were estimated.

(Experiment 2)

Experiment 1 was repeated except that $N_2$ gas was replaced with air, and the corrosion rates and the appearance changes were estimated as to the metal pieces M1 to M5.

(Estimation Items)

<Corrosion Rate>

Mass reductions of the metal pieces M1 to M5 were measured according to the following equation:

Mass Reduction=(Mass before Experiment)−(Mass after Experiment)

The corrosion rates (mm/year) were calculated by dividing the mass reduction by the experiment term.

<Appearance Observation and Micro-Structure Observation>

The metal pieces M1 to M5 were estimated by observing their appearance corrosion states with using a magnifying glass (magnifying power: 10 times) while observing their outside micro-structure cracks with using an optical microscope. The estimation was carried out as to whether or not stress corrosion crack (SCC), pitting corrosion, and/or crevice corrosion occurred. The results of the estimation were shown in Table 1 below. In Table 1, "X" means that the specified corrosion was observed, and "O" means that no specified corrosion was observed.

It is noted that the pitting corrosion means that the corrosion intensively occurs at a local point on the surface of the metal piece so as to form a corrosion pit, and that the crevice corrosion means that the corrosion occurs in the gap between the U-bend metal piece and a bolt and/or nut which fix the metal piece.

In Table 1 below, the materials of the metal pieces M1 to M5 used in the Experiments are shown in addition to the estimation results of the Experiments. In the Experiment 1 where the metal pieces were immersed in the pure water to which $N_2$ gas and $H_2S$ gas were bubbled, no corrosion was observed as to any of the metal pieces M1 to M5. On the other hand, the Experiment 2 where the metal pieces were dipped in the pure water to which the air and $H_2S$ gas were bubbled, the SCC and the pitting corrosion occurred on the surface of the metal piece M1, the pitting corrosion and the crevice corrosion occurred on the surfaces of the metal pieces M2 and M4.

It is understood from the above experimental results that the metal surface is corroded under the environment containing $H_2S$, water and air. Further, it is also understood that the metal surface corrosion is suppressed under the environment which contains $H_2S$, water and $N_2$ without air, so that the prevention of the entry of the air into the molten sulfur reservoir leads to wide selection range of the material which forms the molten sulfur reservoir.

TABLE 1

| metal piece | | material | corrosion rate (mm/year) | corrosion state | | |
|---|---|---|---|---|---|---|
| | | | | SCC | pitting corrosion | crevice corrosion |
| Experiment 1 | M1 | SUS304 | 0.00 | ○ | ○ | ○ |
| N₂ bubbling | M2 | SUS304L | 0.00 | ○ | ○ | ○ |
| | M3 | SUS316L | 0.00 | ○ | ○ | ○ |
| | M4 | SUS347 | 0.00 | ○ | ○ | ○ |
| | M5 | SUS329J4L | 0.00 | ○ | ○ | ○ |
| Experiment 2 | M1 | SUS304 | 0.10 | X | X | ○ |
| air bubbling | M2 | SUS304L | 0.02 | ○ | X | X |
| | M3 | SUS316L | 0.00 | ○ | ○ | ○ |
| | M4 | SUS347 | 0.00 | ○ | X | X |
| | M5 | SUS329J4L | 0.00 | ○ | ○ | ○ |

Next, the above mentioned metal pieces M1, M3 and M5 were placed in a gas phase of a molten sulfur reservoir of the sulfur recovery plant, and Experiments as described below were carried out. It should be noted that the metal pieces M3 and M5 showed no corrosion in the above Experiments 1 and 2.

(Experiment 3)

The sulfur recovery plant 1 which included the regenerated sulfur recovery apparatus 100 was operated. During heating the molten sulfur reservoir 20 by the reservoir heating means 21, $N_2$ gas was supplied to the molten sulfur reservoir 20 by using the inert gas supply means 51. It is noted that the sulfur recovery plant 1 was operated in a cycle which included the liquid sulfur recovery for 11 days and the regenerated sulfur recovery for 3 days, and four such cycles (totally 56 days) were repeated with the sulfur recovery plant 1. That is, the molten sulfur reservoir 20 was heated by the reservoir heating means 21 for 12 days in total.

After the operation of the sulfur recovery plant 1 was finished, the metal pieces M1, M3 and M5 positioned in the molten sulfur reservoir 20 were taken out, and they were estimated as to the corrosion extents and the corrosion states of those metal piece surfaces. It is noted that the corrosion extent (g/m² ·hr) was obtained by measuring mass reduction (=(mass before experiment)−(mass after experiment)) of each metal piece and calculating while using the mass reduction. As to the corrosion state, the appearance corrosion observation and the micro-structure state observation were carried out.

(Experiment 4)

The sulfur recovery plant 201 which included the prior art regenerated sulfur recovery apparatus 200 was operated. During heating the molten sulfur reservoir 220 by the reservoir heating means 221, the molten sulfur reservoir 220 and its outside was communicated with the exhaust gas line 241. Therefore, it was possible that air as the outside gas entered the molten sulfur reservoir 220 through the exhaust gas line 241. It is noted that the sulfur recovery plant 201 was operated in a cycle which included the liquid sulfur recovery for 11 days and the regenerated sulfur recovery for 3 days, and six such cycles (totally 84 days) were repeated with the sulfur recovery plant. That is, the molten sulfur reservoir 220 was heated by the reservoir heating means 221 for 18 days in total.

After the operation of the sulfur recovery plant 201 was finished, the metal pieces M1, M3 and M5 positioned in the molten sulfur reservoir 220 were taken out, and their surfaces were estimated as to the corrosion extents and the corrosion states of the those metal piece surfaces as in Experiment 3.

In Table 2 below, the materials of the metal pieces M1, M3 and M5 used in the Experiments are shown in addition to the estimation results of the Experiments. It is understood that the metal pieces M1, M3 and M5 positioned in the prior art molten sulfur reservoir 220 of the regenerated sulfur recovery apparatus 200 corroded more heavily in extent when compared with the metal pieces M1, M3 and M5 positioned in the molten sulfur reservoir 20 of the regenerated sulfur recovery apparatus 100.

It is understood from the above mentioned experimental results as described that with the regenerated sulfur recovery apparatus 100 and during heating the molten sulfur reservoir 20 by the reservoir heating means 21, the supply of $N_2$ gas into the molten sulfur reservoir 20 by means of the inert gas supply means 51 prevents the formation of the atmosphere in the molten sulfur reservoir 20 which contains $H_2S$, steam and air, so that the corrosion of the metal pieces M1, M3 and M5 is suppressed.

TABLE 2

| metal piece | | Experiment 3 regenerated sulfur recovery apparatus 100 | | Experiment 4 regenerated sulfur recovery apparatus 200 | |
|---|---|---|---|---|---|
| | material | corrosion extent (g/m² · hr) | corrosion state | corrosion extent (g/m² · hr) | corrosion state |
| M1 | SUS304 | 0.002 | a little corrosion with no problem | 0.026 | SCC occurring, pitting corrosion occurring |
| M3 | SUS316L | 0.001 | a little corrosion with no problem | 0.006 | corrosion over whole surface |
| M5 | SUS329J4L | 0.000 | no corrosion | 0.002 | metallic luster disappeared over whole surface |

What is claimed is:

1. A regenerated sulfur recovery apparatus positioned in a sulfur recovery plant which apparatus comprises a sulfur purifier which cools gaseous sulfur so as to condensate it to form liquid sulfur while removing impurities contained therein, characterized in
that it comprises
a steam supplying means which supplies steam into the sulfur purifier, so that solid sulfur deposited onto an inner wall of the sulfur purifier is melted,
a molten sulfur reservoir which recovers and stores such sulfur melted by the steam supplying means,
a reservoir heating means which heats the molten sulfur reservoir, an exhaust gas line which directs an exhaust gas formed in the molten sulfur reservoir to its outside which gas is formed when the molten sulfur reservoir is heated by the reservoir heating means, and an inert gas supply means which supplies an inert gas to the molten sulfur reservoir, and that the inert gas supply means supplies the inert gas such that the inert gas supplied into the molten sulfur reservoir flows to its outside through the exhaust gas line when the molten sulfur stored in the molten sulfur reservoir is discharged from the molten sulfur reservoir.

* * * * *